Figure 1:
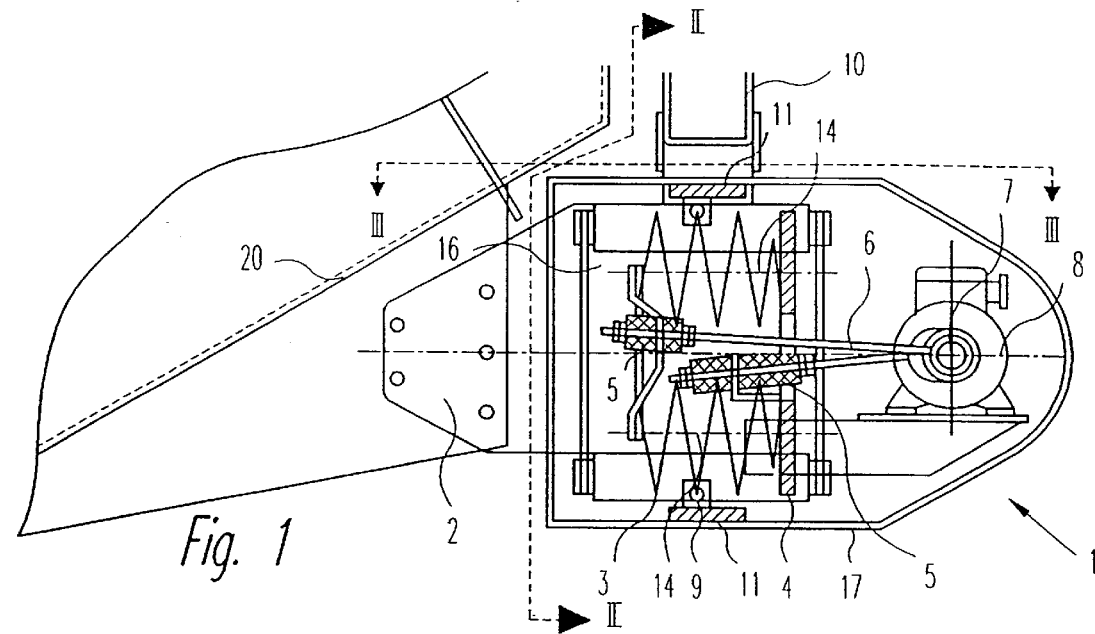

United States Patent [19]
Skak

[11] Patent Number: 5,836,204
[45] Date of Patent: Nov. 17, 1998

[54] VIBRATION GENERATOR AND MACHINE WITH SUCH A GENERATOR

[75] Inventor: Valdemar Skak, Fåborg, Denmark

[73] Assignee: Aktieselskabet Valdemar Skak Dansk Svingningsteknik, Denmark

[21] Appl. No.: 817,013

[22] PCT Filed: Sep. 8, 1995

[86] PCT No.: PCT/DK95/00361

§ 371 Date: Mar. 19, 1997

§ 102(e) Date: Mar. 19, 1997

[87] PCT Pub. No.: WO96/09126

PCT Pub. Date: Mar. 28, 1996

[30] Foreign Application Priority Data

Sep. 19, 1994 [DK] Denmark ................. 1076/94
Feb. 22, 1995 [DK] Denmark ................. 0192/95

[51] Int. Cl.[6] ............... B06B 1/14; B65G 27/32
[52] U.S. Cl. ............... 74/61; 74/44; 366/114; 366/116; 209/365.1; 198/766
[58] Field of Search ............ 74/44, 61; 366/109, 366/111, 114, 116; 209/365.1, 365.3; 198/752.1, 760, 763, 764, 766; 267/166

[56] References Cited

U.S. PATENT DOCUMENTS 3,291,289 12/1966 Savage .
4,913,281 4/1990 Muller .

FOREIGN PATENT DOCUMENTS 0512261 11/1992 European Pat. Off. .
845279 7/1952 Germany .
1017530 10/1957 Germany .
1130753 8/1962 Germany .
1171815 6/1964 Germany .
1223755 8/1966 Germany .

*Primary Examiner*—Rodney H. Bonck
*Assistant Examiner*—William C. Joyce
*Attorney, Agent, or Firm*—Jones & Askew

[57] ABSTRACT

A balanced vibration generator (1) for resonance-amplified operation of a machine or equipment (20) comprises at least one set of counter-oscillating masses (4, 16, 20) suspended in a spring system (3) in which the resonance springs are helical springs which also support the masses. The generator comprises a built-in, balanced drive system (6, 7, 8). The generator is suspended in securing elements (10, 11) which comprise special, adjustable securing elements (9) which are in engagement with the resonance springs (3) and arranged in such a manner that the resonance springs, when turned around their longitudinal axes (14), can change spring lengths.

10 Claims, 4 Drawing Sheets

VIBRATION GENERATOR AND MACHINE WITH SUCH A GENERATOR

BACKGROUND OF THE INVENTION

The invention relates to a balanced vibration generator for resonance-amplified operation of a machine or equipment; and a machine with an integrated vibration generator for resonance enhance operations.

Vibration generators are used in many places within industry where there is need for a well-defined, controlled vibration, e.g. for the operation of vibration troughs, vibration feeders, vibration screens etc.

The known vibration generators can be configured as a vibration motor, i.e. an electromotor with counterweights mounted on the axle journals, as a mechanical vibrator with axles being coupled together and having counterweights, said axles being driven by an external motor, or so-called electromagnetic vibrators where an electromagnet constitutes the driving aggregate in a natural-frequency system.

The known vibration generators are mounted on the object or the machine which is desired to be brought into oscillation. Normally, the machine is connected to a base by means of springs. With the known constructions, particularly with larger vibration machines, undesired vibrations are transferred through the machine support to the base, with consequent disadvantages for the surroundings and undesired loss of energy.

When constructing vibration machines in accordance with the so-called natural-frequency system, it is possible to a large extent to eliminate the transfer of undesired vibration from the machine to the base, while at the same time considerably reducing the energy requirements during operation.

Therefore, extensive efforts are made to configure vibration generators and vibration machines as natural-frequency systems, and the present invention therefore relates also to a natural-frequency system.

Natural-frequency systems are often built up in such a manner that two masses are connected to spring elements and are made counter-oscillatory during operation, whereby the energy periodically migrates from tensioned springs to masses in movement and back again to tensioned springs. A great advantage with natural-frequency systems is that only a modest supply of power is needed when the system has first been made to oscillate close to the resonant frequency. Moreover, it is known that by individual, elastic suspension of each of the counter-oscillating masses, the problems with the transfer of vibrations to the base can be reduced.

From DE publication no. 1.017.530 a method is known for the support of a natural-frequency machine whereby the centers of the two counter-oscillating masses lie on the so-called line of movement, where the two intermediate resonance springs are placed in such a manner in relation to the center of the total mass that each of the masses describes its own translatory movement in relation to the base, and where the elastic connection to the base in the shape of suspension springs is configured with spring constants which are proportional to the relevant mass.

From EP publication no. 512.261 there is known a so-called circular feeder with a vibration generator with counter-oscillating masses, and which is arranged so that the spring constant for the whole spring system can be changed by the adjustment of a handwheel. The springs are secured in a retaining mechanism which comprises a holder extending axially through the spring loops, and at each end comprises a handwheel for the adjustment of the overall length of the springs. It is hereby possible to adjust the resonant or natural frequency of the system. A possible imbalance from the point of view of weight can not immediately be removed by adjusting the mechanism, so that it is avoided that oscillation energy from an imbalance is led to the base or the like.

From U.S. Pat. No. 3,291,289 there is further known a vibrating conveyor where the counter-oscillating masses comprise a natural-frequency system, and where the counter-oscillating masses form a conveyor. All of the spring systems forming part of the vibration system are built up of two springs disposed in series, axially in relation to one another and coupled together by means of a support. The coupling point must constitute the elastic center-point of the springs. The transfer of oscillations to the base is hereby substantially avoided, depending on how close the support has been placed to the elastic center-point of the springs.

ADVANTAGES OF THE PRESENT INVENTION

By configuring a vibration generator according to the invention, the possibility is provided in a particularly practical manner of being able to completely avoid the transfer of oscillations and herewith energy to the base. The resonance springs in the form of helical springs are used both as supporting element and as resonance springs for the counter-oscillating masses. According to the invention, these helical springs can be turned around their axes in such a manner that regard can be paid to the actual stroke length of the counter-oscillating masses, so that it is the totally static point of the spring wire (coil) which is coupled to the frame and herewith to the floor or the base so that no oscillation energy is transferred to the floor or base.

The possibility is hereby provided in a simple manner of being able to carry out subsequent adjustment of a vibration machine or to set a vibration generator in relation to the machine with which it is coupled together, so that the transfer of vibrations to the base or the machine frame is completely avoided.

Furthermore, it has been shown in practice that the losses are less with the invention than they are with known generators or machines. Also, there is less weight involved and herewith lower costs, and the level of noise is reduced because the movements are harmonic, whereby unpleasant overtones such as those arising with known constructions are avoided. Finally, the many advantages provide possibility of more areas of application than the known constructions. The generator itself and also its outer jacket or housing are completely at rest, so that it can be built on a weight without the vibrations disturbing the weighing. The generator can also be built into special machines, e.g. vehicles.

With certain embodiments of a machine with vibration generator according to the invention and the balanced drive system can be built into the generator.

Normally, the counter-oscillating masses which are suspended in the resonance springs will be supported solely by the springs, so that the springs constitute the only fixed connection to the base or similar support. In some types of machines, one or more guide blades or the like can be added in a known manner, e.g. from trough to base at the discharge end of the trough in a so-called vibration feeder, hereby ensuring the correct translatory movement of the masses.

The vibration generator or machine is preferably configured with a through going spring divide as resonance springs, in that this results in a halving of the number of springs in comparison with the known machines, a lowering of the production costs and less weight without this giving rise to any disadvantages whatsoever. Moreover, the problems with the joining-together of two springs coupled in series in accordance with U.S. Pat. No. 3,291,289 are eliminated.

The vibration generator or machine according to the invention is preferably configured with elastic clamp securing the resonance spring. The suspension achieved hereby forms a suitably rigid connection with the machine or the equipment to which the vibrations are to be transferred, without this giving rise to any noise, losses or other disadvantages in connection herewith.

A balanced vibration generator according to the invention comprises a built-in, balanced drive system which can be configured with connecting rods coupled to counter-oscillating masses. The possibility is hereby provided of producing simple, robust constructions without the disadvantages of the known systems, and where a much greater length of stroke is possible than with the known vibrators. The construction according to the invention is particularly suitable for operation and regulation with frequency converters when a standard motor is used, which enables simple coupling to main power supplies with frequencies other than those for which the motor is arranged, mobile generating plants and the like.

The balanced vibration generator according to the invention can be configured as a completely independent unit and arranged for suspension from a machine or machine frame. The vibration generator further comprises means for coupling a work piece which constitutes one or a part of one of the counter-oscillating masses; This provides a completely new type of vibrator in the form of a compact vibration unit which can be mounted on all kinds of vibration machines such as feeders, conveyors, screens and the like. After the vibration generator has been mounted on the equipment or the machine to which vibration energy is to be supplied, the resonance springs are adjusted so that the resulting machine is one with optimum characteristics, especially with regard to the avoidance of any transfer of vibrations and vibration energy to the machine frame or the base.

THE DRAWING

Figure 2:
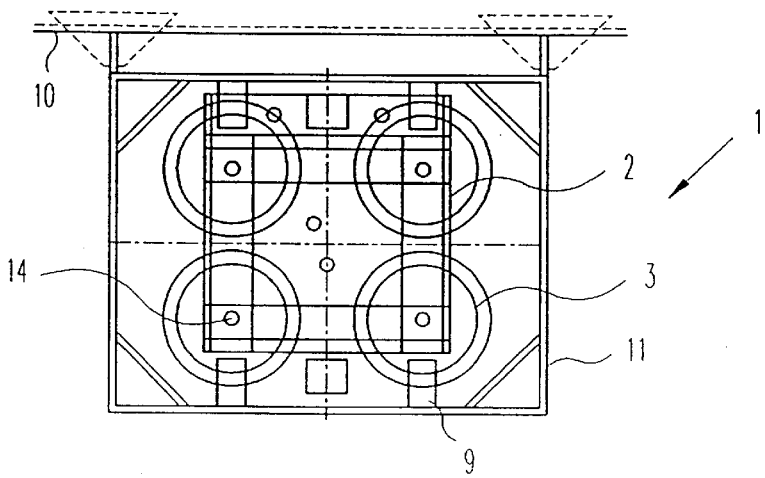
Figure 3:
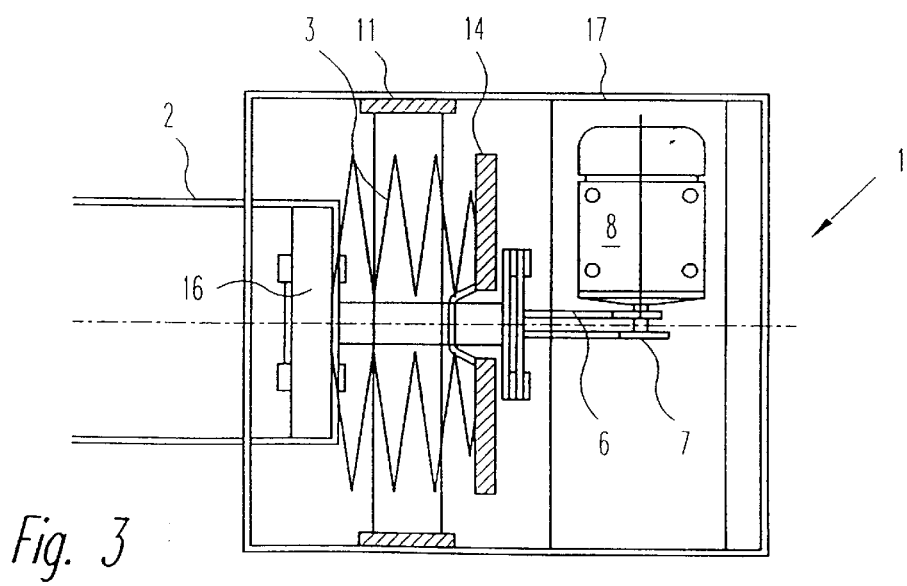
Figure 4:
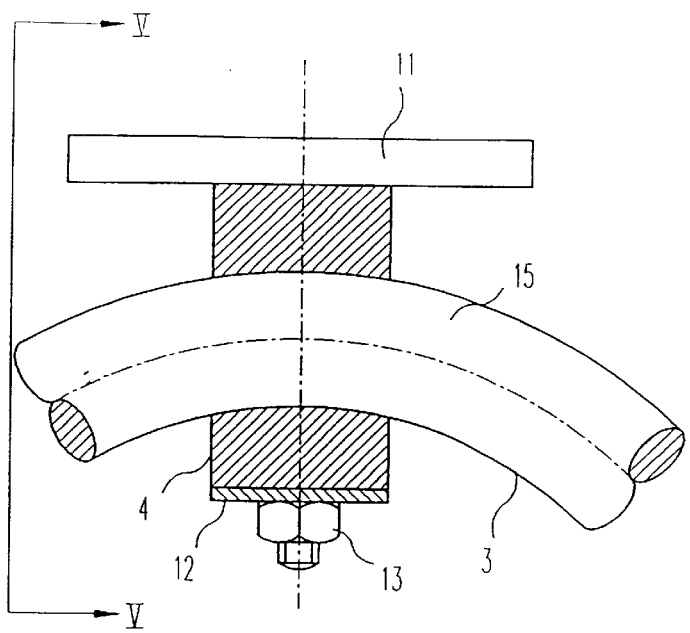
Figure 5:
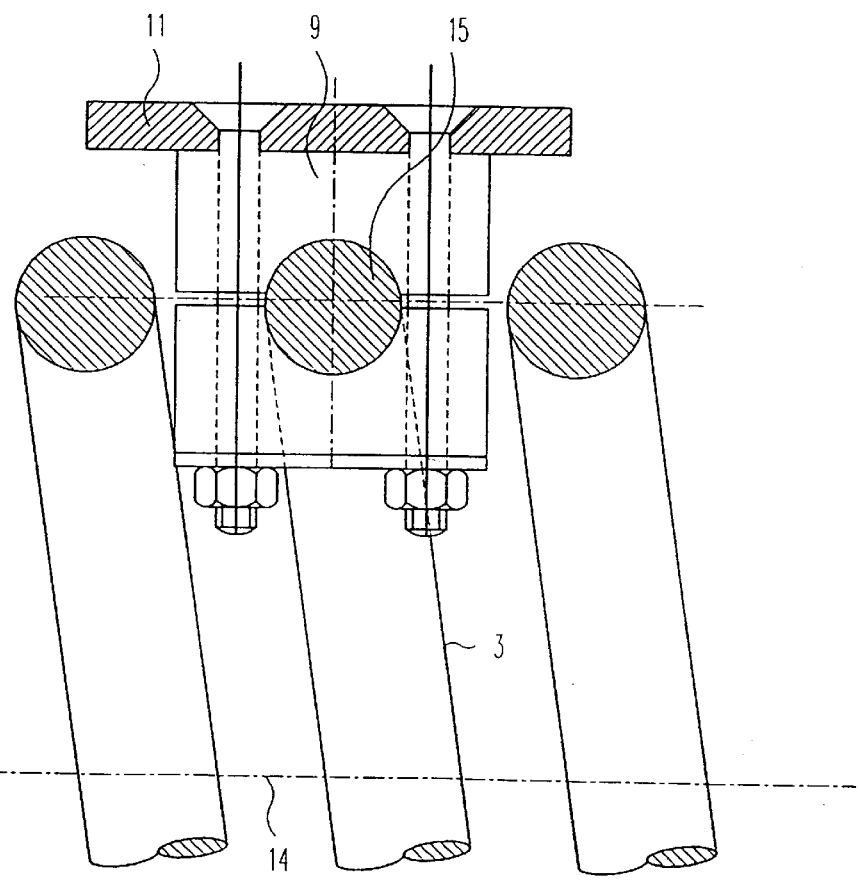
Figure 6:
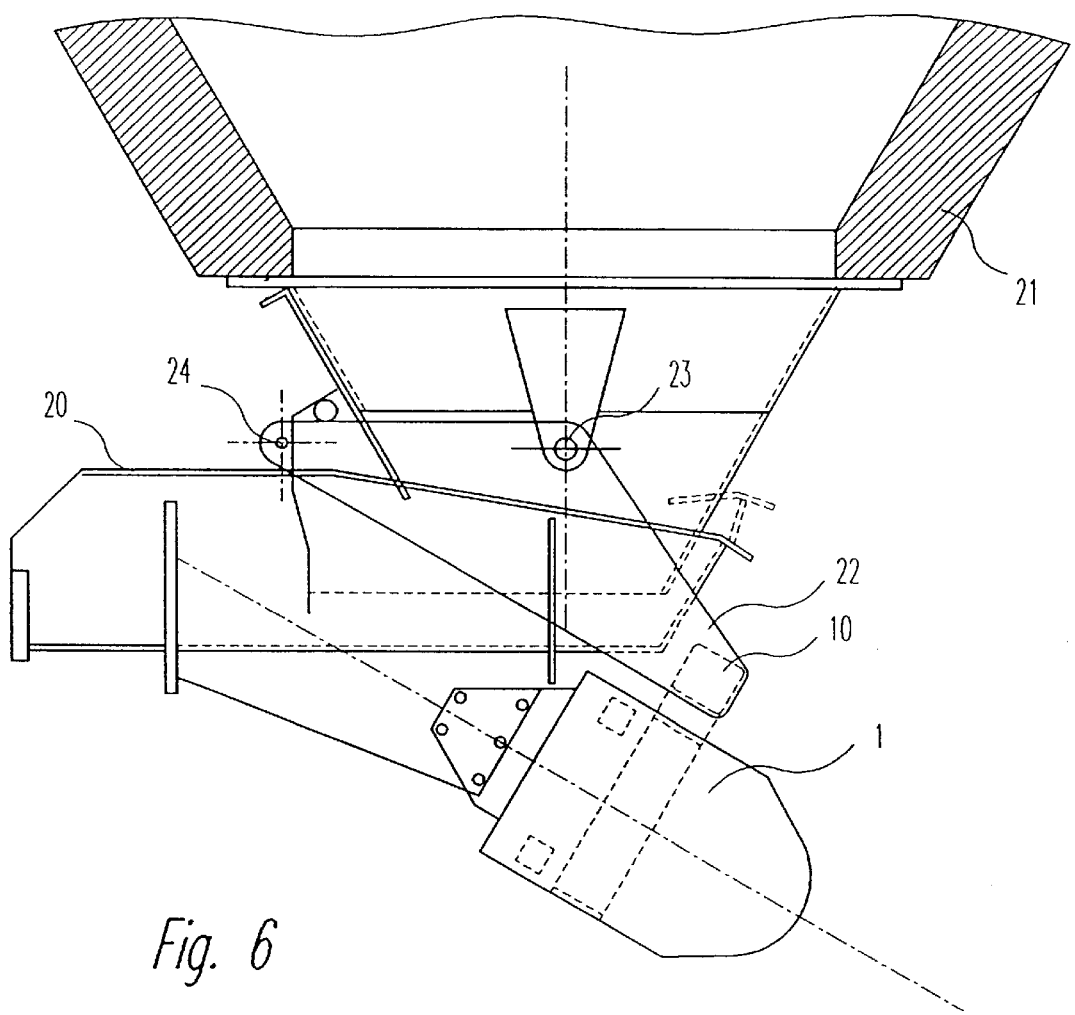
Figure 7:
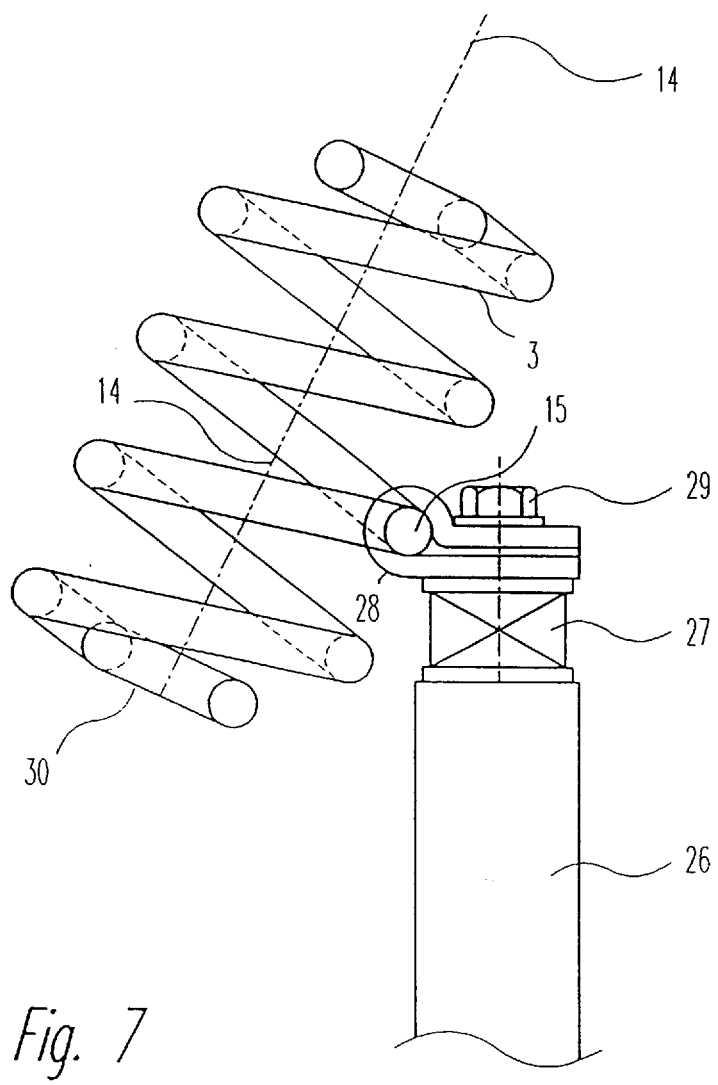

The invention will now be described in more detail with reference to the drawing, in that FIG. 1 shows a vibration generator according to the invention seen in section and coupled to a feeding trough, FIG. 2 shows the vibration generator in FIG. 1, but without housing and without feeding trough and seen in the direction II—II in FIG. 1, FIG. 3 shows the vibration generator seen from above in the direction III—III in FIG. 1 and shown partly in section, FIG. 4 shows on a larger scale a detail partly in section of the adjustable suspension of the helical springs, FIG. 5 shows the same as in FIG. 4, but seen in the direction V—V in FIG. 4, FIG. 6 shows a feeing trough with funnel partly in section and with vibration generator according to the invention, and FIG. 7 shows on a larger scale a second embodiment of the adjustable suspension of a helical spring.

EXPLANATION OF THE EMBODIMENTS IN THE DRAWING

In FIGS. 1–3 is seen a balanced vibration generator 1 according to the invention which, in the example shown, is coupled to a feeding trough 20 of which only a part is shown. The vibration generator 1 is coupled to the feeding trough 20 by means of a rigid vibration bracket 2 in such a manner that the feeding trough 20, the vibration bracket 2 and a plate 16 constitute one of the two counter-oscillating masses, where the second mass comprises the baseplate 4 and possible extra plates mounted on said base-plate. Between the plates 16 and 4 are seen the resonance springs 3, which in the example shown comprise four resonance springs 3. The resonance springs 3 are secured to the plates 16 and 4 in a known manner. At the elastic center-point of the resonance springs, these are coupled to a rigid steel frame 11 by means of adjustable clamps 9, which are explained later in connection with FIGS. 4 and 5. The rigid steel frame 11 is secured to a beam 10 so that the whole weight of the vibration generator 1 and the feeding trough 20 is supported by this beam.

The two counter-oscillating masses are each coupled via their separate drive-rods or connecting-rods 6 to a drive motor which, in the case shown, is an electromotor 8, a so-called norm-motor which on its axle jornal has two eccentrics 7 set at 180° opposite each other. The two connecting-rods 6 are coupled in a fixed manner to the two plates 16, 4 by means of rubber cylinders 5.

Around the whole of the vibration generator there is placed a metal housing 17 which encloses the whole of the vibration generator but has an opening for the vibration bracket 2.

When the motor 8 is started, the two counter-oscillating masses are moved in the resonance system which comprises the four helical springs. If the clamps 9 are disposed precisely at the static point of the springs, there will be no vibration energy transferred to the beam 10 and herewith the machine base, but all of the energy alternates between the counter-oscillating masses and the resonance springs, which means that the vibration trough 20 will function as desired.

The setting of the suspension of the resonance springs is explained below with reference to FIGS. 4 and 5, which show sections of the securing elements on a larger scale. These consist of clamps 9 of rubber or other flexible material which are secured firmly to the steel frame 11 by means of a plate 12 and bolts 13. By loosening the bolts 13 and possibly the end securing brackets for the resonance springs, it is possible to turn the springs 3 around their longitudinal axes 14 until the static point of each of the spring wires 15 is in engagement with the clamps 9. When this position is reached, the bolts 13 are tightened again, and the vibrator can now function as desired.

FIG. 6 shows a second embodiment, where a vibration generator 1 is suspended under a funnel 21 from which material is transferred to a feeding trough 20. The generator 1 is suspended in the beam 10, which in turn is suspended in a special bracket 22 which is suspended in a pivotable manner around a point 23. The balanced vibrator with feeding trough is hereby mounted on the funnel in such a manner that the slope of the trough 20 can easily be adjusted as required by means of the adjusting element 24.

Finally, in FIG. 7 is shown a second embodiment of the adjustable securing element, in that the securing element comprises a bracket 28 which grips around one of the coils 15 of the spring 3, said bracket being capable of being tightened or loosened with a bolt so that the spring 3, when turned around the axis 14, can be adjusted in such a manner that the engagement of the bracket 28 with the coil 15 is at precisely that point at which the spring is static. 26 shows a machine frame, and the bracket 28 can comprise a flexible item 27 which makes it possible for the bracket 28 to twist slightly under the influence of the spring, and moreover which prevents possible oscillations from reaching the machine frame.

The resonance spring(s) 3 can, for example, be terminated at each end with a central eye 30 for fastening to the counter-oscillating masses with a bolt. Thus, in a simple manner the spring can be secured so that it can withstand traction, which means that even greater oscillation amplitudes are possible.

I claim:

1. Balanced vibration generator (1) for resonance-amplified operation of a machine or equipment and comprising at least one set of counter-oscillating masses (4, 16, 20) suspended in a spring system (3), where the spring system includes resonance springs in the form of helical springs (3) which essentially also support the masses, also comprising a balanced drive system (6, 7, 8) built into the generator, and where the vibration generator is suspended from securing elements (10, 11) which are in engagement with the resonance springs (3) around their elastic center-point, characterized in that the resonance springs are mounted in the securing elements (9, 28) which are in fixed connection with a base or a support in such a manner that the springs, by being turned around their longitudinal axes (14), can change the relationship between the lengths of the springs from the securing element and to the counter-oscillating masses.

2. Balanced vibration generator according to claim 1, characterized in that at each securing element (9, 28) there is used a through-going spring (3) divided as resonance springs, in that the securing element is in adjustable engagement with the actual coil (15) of the spring.

3. Balanced vibration generator according to claim 1, characterized in that the securing elements comprise elastic clamps, (9, 27).

4. Balanced vibration generator according to claim 1, characterized in that the balanced drive system comprises an electromotor (8), having a drive shaft, the drive shaft of which comprises eccentrics (7) or cranks which via driving rods, (6), are coupled to the counter-oscillating masses (4, 16, 20).

5. Balanced vibration generator according to claim 1, characterized in that the drive system comprises at least one pneumatic or hydraulic motor.

6. Balanced vibration generator according to claim 1, characterized in that the drive system comprises an electromagnetic drive mechanism.

7. Balanced vibration generator according to claim 1, characterized in that the vibration generator is an independent machine element (1) with means (10, 11) arranged for the suspension of the machine element on a machine or a machine frame, and with means (2) for coupling the machine element to a work piece (20) which constitutes the one or a part of one of the counter-oscillating masses.

8. Machine with a vibration generator for resonance-amplified operation and comprising at least one set of counter-oscillating masses suspended in a spring system, where the spring system includes resonance springs in the form of helical springs which essentially also support the masses, and comprising a balanced drive system, and where the vibration generator is suspended from a machine part with securing elements which are in engagement with the resonance springs around their elastic centre-point, characterized in that the resonance springs are mounted in the securing elements (9, 28) which are in fixed connection with a base or a support, and in such a manner that the springs, when turned around their longitudinal axes (14), can change the relationship between the spring lengths from the securing element and to the counter-oscillating masses.

9. Machine according to claim 8, characterized in that at each securing element there is used a through-going spring divided as resonance springs, in that the securing element is in adjustable engagement with the actual coil of the spring.

10. Machine according to claim 8, characterized in that the securing elements comprise elastic clamps.

* * * * *